United States Patent [19]

Lamarche

[11] 4,413,711
[45] Nov. 8, 1983

[54] EXTENDED TRAVEL DAMPER IN A LOCK-UP CLUTCH FOR A TORQUE CONVERTER

[75] Inventor: Paul E. Lamarche, Utica, Mich.

[73] Assignee: Borg-Warner Corporation, Chicago, Ill.

[21] Appl. No.: 248,778

[22] Filed: Mar. 30, 1981

[51] Int. Cl.³ ........................ F16H 45/02; F16D 3/14
[52] U.S. Cl. .................... 192/3.28; 192/106.2
[58] Field of Search ............ 192/106.2, 106.1, 70.16, 192/3.28, 3.29; 403/35, 36, 37, 38; 29/508, 513, 509; 464/67, 68

[56] References Cited

U.S. PATENT DOCUMENTS

| | | | |
|---|---|---|---|
| 2,149,887 | 3/1939 | Hickman | 64/27 C |
| 2,574,573 | 11/1951 | Libby | 64/27 C |
| 2,630,175 | 3/1953 | Dickerman | 29/509 X |
| 3,877,555 | 4/1975 | Rist | 29/513 X |
| 3,995,726 | 12/1976 | DeGennes | 192/106.2 |
| 4,138,003 | 2/1979 | Malloy | 192/3.29 |
| 4,139,995 | 2/1979 | Lamarche | 64/27 C |
| 4,188,805 | 2/1980 | Fall et al. | 64/27 C |
| 4,188,806 | 2/1980 | Fall et al. | 64/27 C |
| 4,222,476 | 9/1980 | LeBrise | 192/106.2 |
| 4,223,776 | 9/1980 | Berlioux | 192/106.2 |
| 4,232,534 | 11/1980 | Lamarche | 64/27 C |
| 4,240,532 | 12/1980 | Blomquist | 192/3.28 |
| 4,353,444 | 10/1982 | Bionaz | 192/3.29 |

FOREIGN PATENT DOCUMENTS 166939 7/1921 United Kingdom ............... 64/27 C

Primary Examiner—George H. Krizmanich
Attorney, Agent, or Firm—James A. Geppert

[57] ABSTRACT

An extended travel vibration damper for a lock-up clutch utilized in a torque converter where both the clutch friction surfaces and the damper structure are located radially outwardly in the torque converter housing, with the damper being formed of a plurality of annular members with damper springs to provide a compact structure where there is limited space in the torque converter.

14 Claims, 10 Drawing Figures

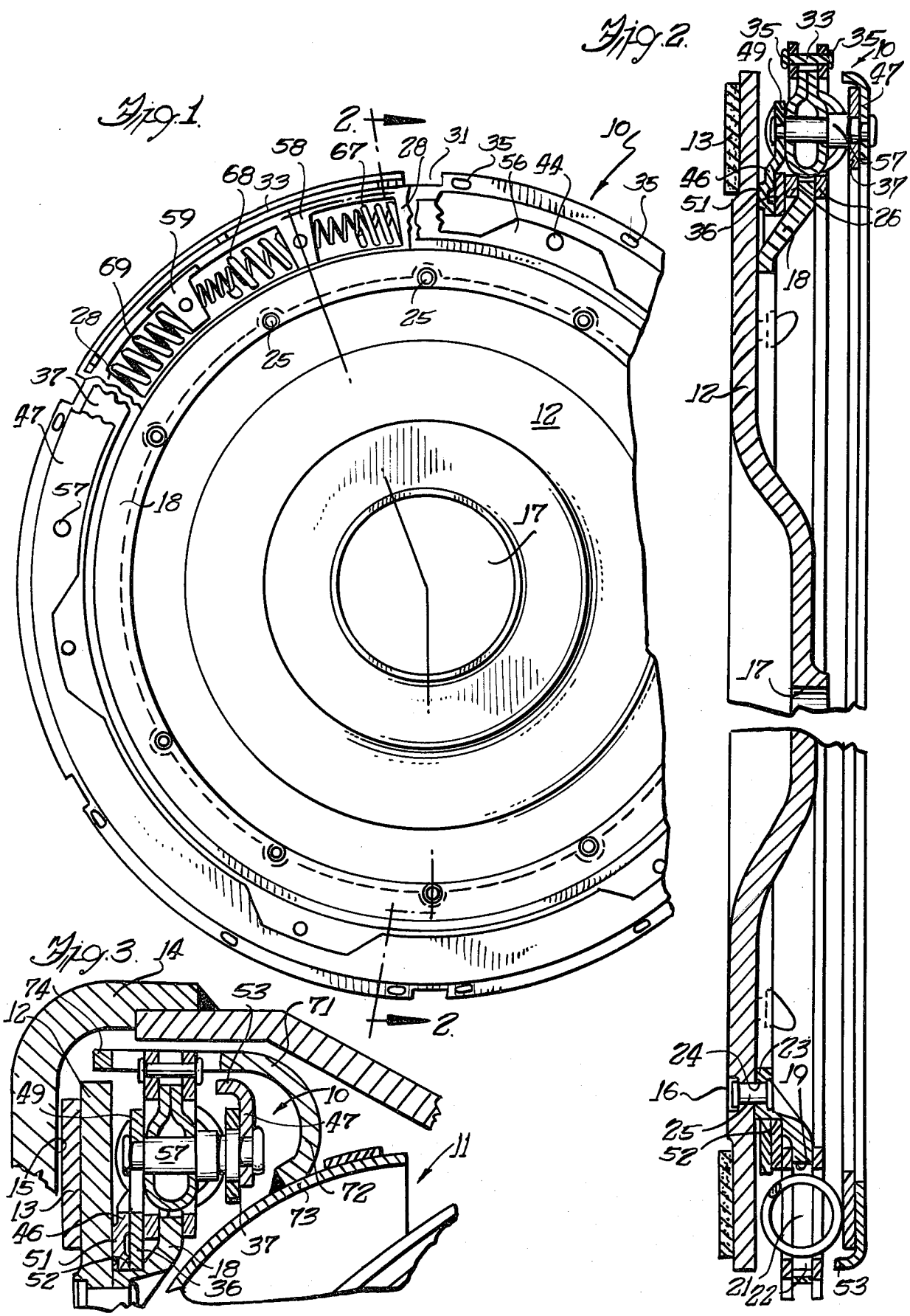

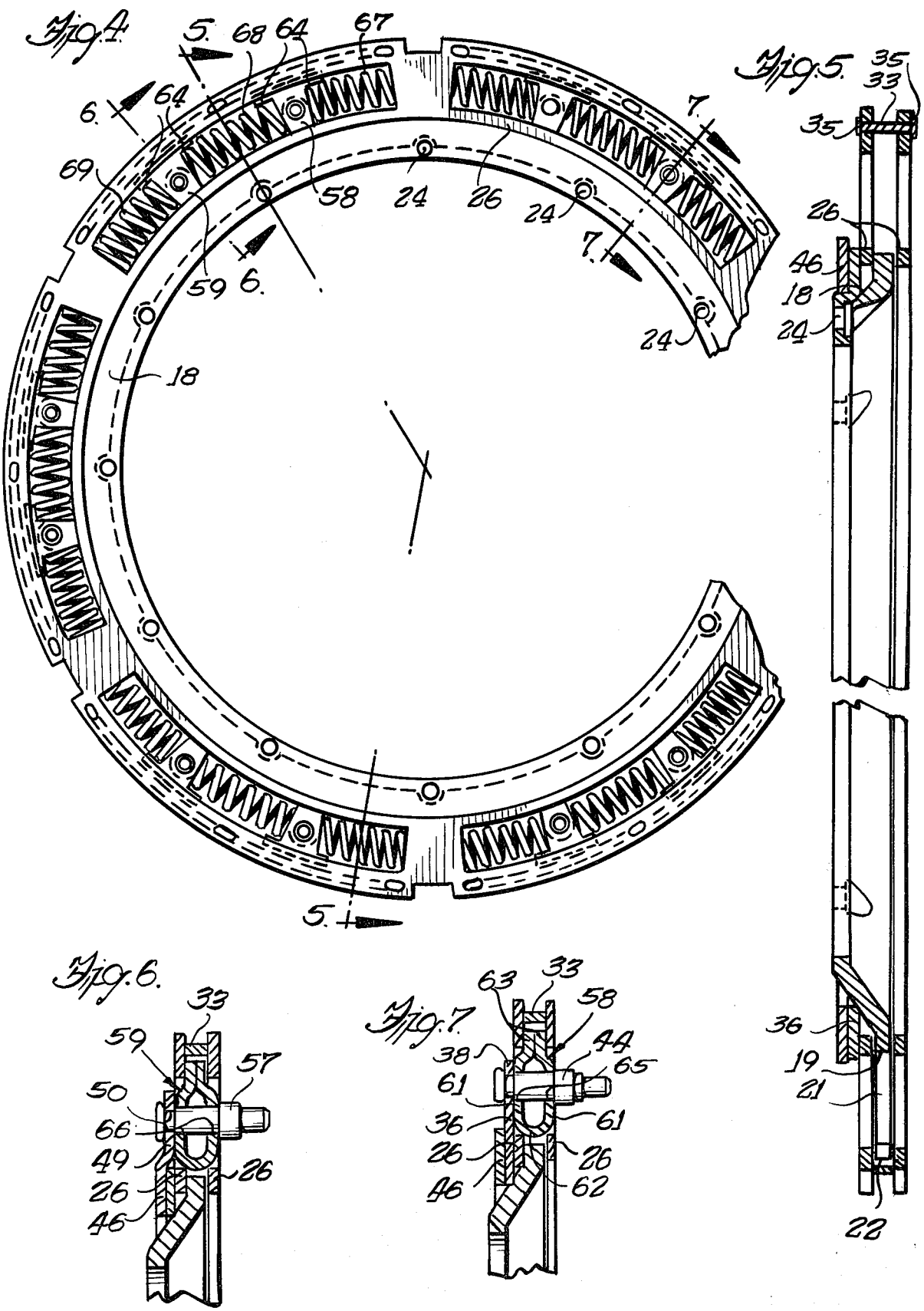

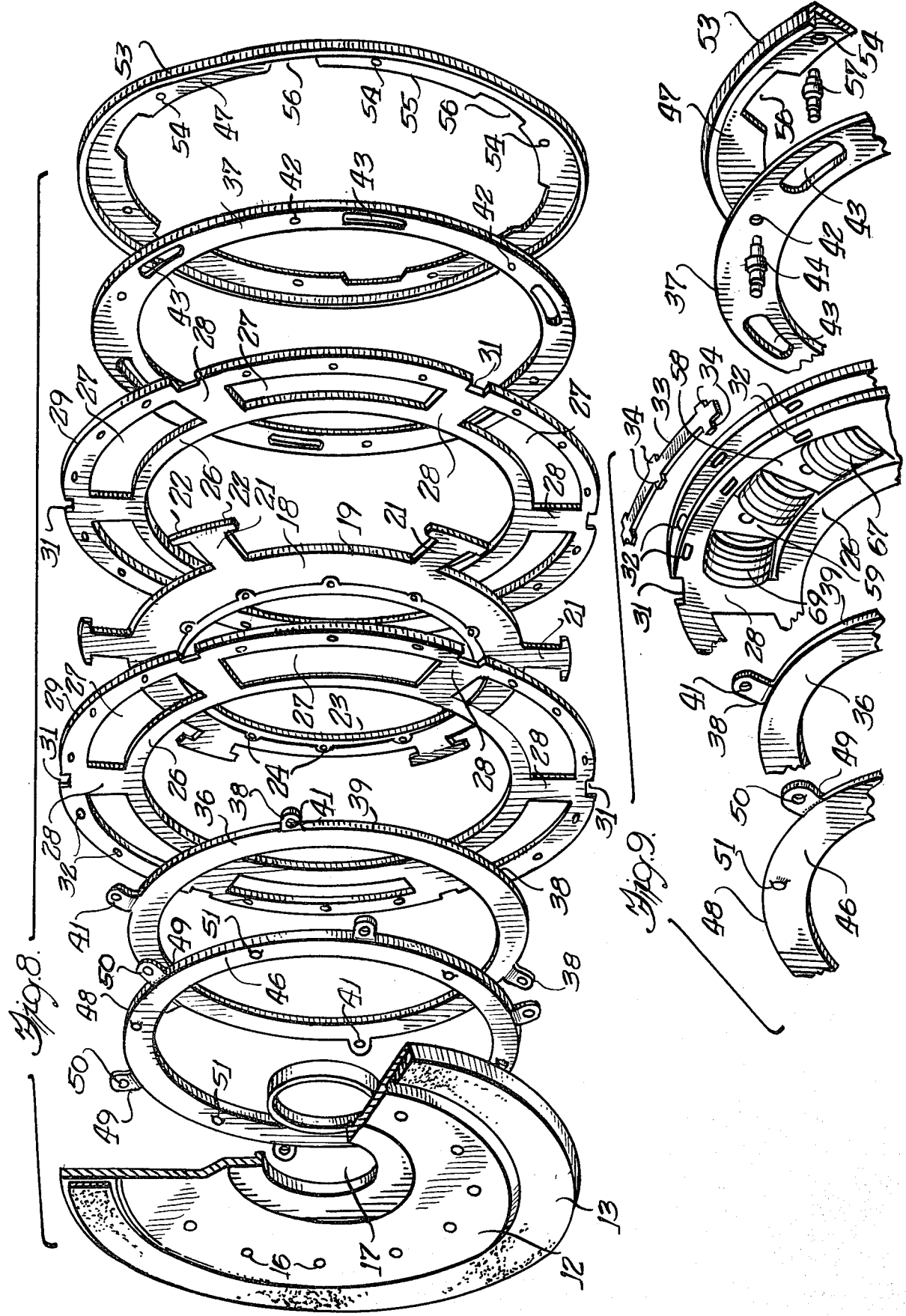

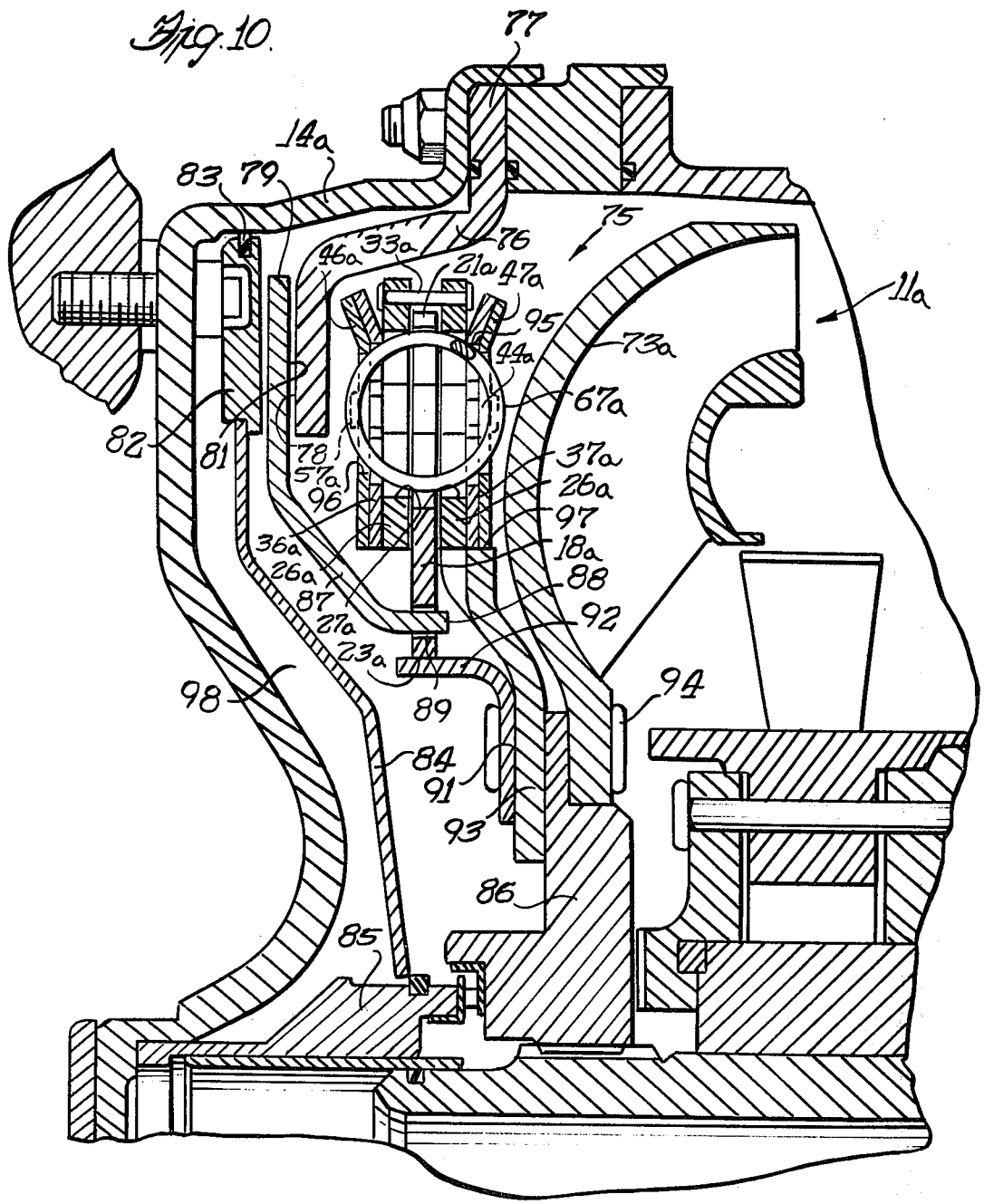

EXTENDED TRAVEL DAMPER IN A LOCK-UP CLUTCH FOR A TORQUE CONVERTER

BACKGROUND OF THE INVENTION

In an automatic transmission for an automotive vehicle, a fluid coupling or torque converter is located between the input shaft from the vehicle engine and the transmission input shaft, and vibrations which normally occur in the drive train are effectively absorbed hydraulically in the fluid coupling. However, a hydraulic torque converter has a certain degree of slippage, even at high speeds, so as to lose fuel economy. To enhance fuel economy of a vehicle equipped with an automatic transmission, a lock-up clutch may be incorporated in the torque converter which, at a predetermined point relative to vehicle speed, load and acceleration, engages to provide a direct drive between the input and output of the torque converter in high gear.

When locked in direct drive, the torsional vibrations in the drive train will not be hydraulically absorbed and a torsional vibration damper is required. As the space requirements for a torque converter are limited, the present invention relates to a compact vibration damper assembly which is positioned in the torque converter housing along with the lock-up clutch so as to absorb the drive train vibrations.

SUMMARY OF THE INVENTION

The present invention comprehends the provision of a novel vibration damper assembly utilized in combination with a lock-up clutch in a torque converter wherein the assembly is compact so as to fit within the liquid confines of the torque converter housing. The assembly is positioned towards the outer periphery of the torque converter turbine and is connected between the clutch plate cooperating with the torque converter housing and the turbine shell adjacent its outer periphery.

The present invention also comprehends the provision of a novel vibration damper assembly wherein the assembly is formed from a plurality of generally flat annular plates with damper springs interposed in arcuate windows formed in several of the plates.

The present invention further comprehends the provision of a novel elongated connecting strip to fasten a pair of plates in a spaced parallel arrangement. The connecting strip is arcuate in its longitudinal dimension and has laterally extending tabs which project through slots in the plates to be joined together and are upset to hold the plates in their operative position.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a rear elevational view of the vibration damper assembly with a portion broken away and removed from the torque converter.

FIG. 2 is a cross sectional view of the damper assembly taken on the irregular line 2—2 of FIG. 1.

FIG. 3 is a partial cross sectional view similar to the upper portion of FIG. 2, but showing the connection with the torque converter.

FIG. 4 is a rear elevational view of the damper plate sub-assembly with a portion broken away.

FIG. 5 is a cross sectional view taken on the irregular line 5—5 of FIG. 4 with the springs and separators omitted.

FIG. 6 is a partial cross sectional view taken on the line 6—6 of FIG. 4.

FIG. 7 is a partial cross sectional view taken on the line 7—7 of FIG. 4.

FIG. 8 is an exploded perspective view of the damper assembly with the damper springs omitted.

FIG. 9 is a partial exploded perspective view of the partially assembled damper assembly.

FIG. 10 is a partial cross sectional view through an alternate embodiment of vibration damper assembly.

DESCRIPTION OF THE PREFERRED EMBODIMENTS

Referring more particularly to the disclosure in the drawings wherein are shown illustrative embodiments of the present invention, FIGS. 1 through 9 disclose a vibration damper assembly 10 mounted adjacent the outer periphery of the turbine 11 in a hydraulic torque converter. The assembly includes a pressure plate 12 having an annular friction facing 13 on the forward surface of the plate adjacent the outer periphery facing an interior surface 15 of the torque converter housing 14, a plurality of circumferentially equally spaced rivet holes 16 spaced radially inwardly of the facing 13 and a central opening 17.

A centrally located annular hub plate 18 has an outer edge 19 with a plurality of circumferentially equally spaced radially outwardly extending hub arms 21 thereon, each arm terminating in circumferentially oppositely extending fingers 22. The inner edge 23 of the hub plate is forwardly offset from the outer edge and has a plurality of circumferentially equally spaced openings 24 adjacent the edge; a plurality of rivets 25 extending through the aligned openings 16 and 24 to secure the pressure plate 12 and hub plate 18 together.

A pair of axially spaced annular spring retainer rings 26,26 sandwich the hub plate 18 therebetween; each retainer ring having a plurality of circumferentially equally spaced arcuate spring windows 27 separated by spokes 28, a plurality of circumferentially equally spaced notches 31 on the outer edge 29 radially aligned with the spokes 28, and a plurality of slots 32 (FIGS. 8 and 9) adjacent the outer edge 29 between the notches. To secure the retainer rings 26,26 together, a plurality of elongated connecting strips 33 are employed. Each flat strip 33 is longitudinally curved as seen in FIG. 9, and has laterally projecting pairs of opposed tabs 34,34 on the edges adapted to extend into the slots 32 of the pair of rings 26. Each of the strips 33 is approximately the length of the arc between adjacent notches 31 and, when assembled together, the tabs 34 project through the slots 32 and are headed or swaged at 35 to secure the rings 26,26 together.

The hub plate 18 and retainer rings 26 are sandwiched between a pair of annular members 36 and 37 forming a first floating equalizer. The member or ring 36 has a plurality of circumferentially equally spaced radially outwardly extending fingers 38 on the outer edge 39 of the ring; each finger having an opening 41 therein. The opposite member or ring 37 includes a plurality of circumferentially equally spaced openings 42 adapted to be axially aligned with the openings 41 in the fingers 38, and an arcuate slot 43 formed in the ring offset centrally from and interposed between each adjacent pair of openings 42. Spacer rivets 44 axially space the rings 36 and 37 apart and are received in the aligned pairs of openings 41 and 42 to secure the rings together.

A second floating equalizer consists of a second pair of rings 46 and 47 sandwiching the first floating equalizer. The ring 46 is substantially identical to the ring 36 in having a plurality of circumferentially equally spaced fingers 49 on the outer edge 48 of the ring, each finger having an opening 50 therein. A plurality of circumferentially equally spaced dimples 51 are formed in the body of the ring 46, each dimple being centrally located between adjacent fingers 49. Also, the hub plate offset inner portion also provides an interrupted generally circular guide surface 52 for the plates 36 and 46 to journal the equalizers. The ring 47 has a forwardly extending outer flange 53, a plurality of openings 54 axially aligned with openings 51 in the fingers 49 to receive the ends of spacer rivets 57 to secure the rings together, and a plurality of circumferentially equally spaced notches 56 in the inner edge 55 of the ring and offset from a central location between adjacent openings 54.

Located within each pair of windows 27 are three spring sets 67,68,69; each set consisting of one or more concentrically arranged helical compression springs, and a pair of spring separators 58 and 59 are located between the spring sets; each separator having a pair of parallel side walls 61 (FIG. 7) connected at a U-shaped base 62 and terminating in abutting flanges 63 having circumferentially oppositely extending ears 64 (FIG. 4). The separator 58 has openings 65 in the walls receiving the spacer rivet 44 while the separator 59 has openings 66 receiving the spacer rivet 57. Thus, the spring separators 58 function with the first floating equalizer while all the separators 59 function with the second equalizer.

When assembled in the torque converter housing 14, the central opening 17 in the pressure plate 12 accommodates the turbine shaft and transmission input shaft (not shown). The hub plate 18 is secured to the pressure plate 12 by the rivets 25, as seen in FIG. 3, and has the hub arms 21 extending between the retainer plates in axial alignment with the spokes 28. The spring sets 67,68 and 69 and the spring separators 58 and 59 are located in each aligned set of windows 27, the spacer rivets 44 extending through the separators 58 and securing the fingers 39 of ring 36 to the ring 37 of the first equalizer; the notches 56 of ring 47 of the second equalizer accommodating the rearward heads of rivets 44.

The fingers 49 of the ring 46 are rearwardly offset as seen in FIG. 6 and are secured by the spacer rivets 57 to the ring 47; the rivets extending through the separators 59 and through the arcuate slots 43 in the ring 37 of the first equalizer. The dimples 52 on ring 46 extend forwardly from the ring to contact the pressure plate 12 and retain the ring parallel to the pressure plate. Also, the fastener strips 33 connect the retainer rings 26,26 in spaced relation to receive the hub arms 21 and the flanges 63 of the spring separators therebetween. Finally, connecting straps 71 (see FIG. 3) are received in sliding engagement in the axially aligned notches 31 in the retainer plates 26 and have rearwardly and inwardly curved ends 72 which are secured to the turbine shell 73 by spot welding; the straps terminating in T-shaped ends 74 to limit axial movement of the damper assembly.

During operation of the torque converter when the friction surfaces 13,15 are not engaged, the damper assembly 10 rotates simultaneously with the turbine 11. When the converter reaches a predetermined speed and the pressure of the hydraulic fluid in the converter reaches a predetermined level, the pressure plate 12 is urged forwardly so that the friction facing 13 engages the surface 15 of the torque converter housing 14. Then the pressure plate will rotate at approximately the same speed as the housing, which will cause the hub plate 18 to rotate therewith. The hub arms 19 will move relative to the retainer plates 26 to compress spring sets 67, which in turn will urge the separators 58 against spring sets 68 causing the first equalizer to rotate. Compression of springs 68 causes movement of separators 59 and rotation of the second equalizer, which in turn compresses the spring sets 69 to act on the spokes 28 of the retainer rings 26 and the connector straps 71 to rotate the turbine. Thus, the housing 14 and turbine shell 11 rotate together in direct drive of the transmission input shaft without any significant slippage.

FIG. 10 discloses an alternate damper assembly 75 wherein like parts will be designated by the same reference numeral with a script a. The torque converter housing 14a is operatively connected to an impeller (not shown) and houses the turbine 11a and the damper assembly. A generally annular member 76 is secured at its outer edge 77 in the housing and has a forwardly offset friction surface 78. An annular friction member 79 has a surface 81 interposed between the surface 78 and a oiston 82 that is axially reciprocable in the housing to engage and disengage the lock-up clutch for the damper. The piston 82 has an outer wiping seal 83 slidably engaging the inner surface of the housing and an inner diaphragm member 84 pivotally mounted on a sleeve 85 abutting the turbine hub 86.

The friction member 79 has an inner rearwardly extending flange 87 with tabs 88 received in circumferentially equally spaced slots 89 formed adjacent the inner edge 23a of the hub plate 18a. The hub plate 18a is piloted on the axially extending flange 92 of an annular member 91 abutting a radially inwardly extending flange 93 on a retainer plate 26a, the member and flange being secured, as by rivets 94, to the turbine hub 86; the rivets 94 also securing the turbine shell 73a to the hub 86. The retainer plates 26a,26a are axially spaced apart and secured together by a plurality of connecting strips 33a.

A first floating equalizer is formed from a pair of annular rings 36a,37a, axially spaced and secured together by spacer rivets 44a and having a spring separator (not shown) mounted on each rivet. A second floating equalizer consists of a pair of annular rings 46a,47a axially spaced apart and secured together by rivets 57a carrying spring separators. The annular hub plate includes a plurality of circumferentially equally spaced hub arms 21a; the hub arms 21a and spring separators separating the three spring sets, of which spring set 67a is shown, which are positioned in the arcuate windows 27a in the plates 26a. The rings 36a,37a having axially aligned arcuate spring windows 95, and the rings 46a,47a have arcuate windows 96; the windows 27a,95 and 96 being axially aligned to accommodate the spring sets. Also, the rear retainer plate 26a has a plurality of rearwardly offset tabs which provide a guide surface 97 for concentric movement of the rear rings 37a and 47a.

The damping action of this embodiment functions in substantially the same manner as described for the embodiment of FIGS. 1 through 9. The only difference resides in the engagement of the clutch surfaces wherein fluid pressure in the chamber 98 between the housing 14a and the piston 82 acts to urge the piston rearwardly to engage the friction member 79, and then these members move farther rearwardly to engage the axially stationary friction surface 78 of the member 76 to lock the housing and impeller in a direct drive of the turbine 11a.

I claim:

1. A torsional vibration damper assembly for a lock-up clutch in a torque converter wherein said damper assembly is located adjacent the periphery of the turbine within the torque converter housing, said vibration damper assembly comprising an annular hub plate having a plurality of circumferentially equally spaced radially extending arms, a torque input member operatively connected to said hub plate, a pair of annular retainer plates axially spaced apart to receive said hub plate therebetween, a first floating equalizer formed of a pair of annular plates axially spaced apart and secured together to receive said retainer plates therebetween, a second floating equalizer formed of a pair of annular plates axially spaced apart and secured together to receive said first equalizer therebetween, said retainer plates having a plurality of elongated arcuate windows therein separated by radial spokes, three spring sets received in each window, and a pair of spring separators received in each window to separate said three spring sets, each of said pair of separators being operatively connected to the alternate floating equalizers, and means operatively connecting said retainer plates to the turbine.

2. A torsional vibration damper assembly as set forth in claim 1, in which said torque input member includes an annular friction surface adapted to engage said torque converter housing and provide a direct drive between said housing and said turbine.

3. A torsional vibration damper assembly as set forth in claim 1, in which said connecting means includes a plurality of connecting straps secured at one end to said turbine and having the opposite ends located in notches formed in the peripheries of said retainer plates.

4. A torsional vibration damper assembly as set forth in claim 3, in which the last-mentioned ends of said connecting straps are received in sliding engagement with said retainer plate notches and terminate in T-shaped ends.

5. A torsional vibration damper assembly as set forth in claim 1, in which a plurality of connecting strips having laterally extending tabs connect said retainer plates together, said plates having circumferentially spaced slots adjacent their peripheries receiving said tabs.

6. A torsional vibration damper assembly as set forth in claim 5, in which said strips are longitudinally curved and laterally perpendicular to said retainer plates.

7. A torsional vibration damper assembly as set forth in claim 1, in which spacer rivets connect the annular plates of each floating equalizer together and extend through the corresponding spring separators for its respective equalizer.

8. A torsional vibration damper assembly as set forth in claim 1, in which said annular plate of said second floating equalizer adjacent said torque input member has a plurality of circumferentially spaced forwardly extending dimples formed in the plate surface to engage the torque input member and space the floating equalizer therefrom.

9. A torsional vibration damper assembly as set forth in claim 1, in which said connecting means includes a plurality of radially inwardly extending straps integral with the innermost retainer plate and secured to the turbine hub.

10. A torsional vibration damper assembly as set forth in claim 1, in which said hub plate has a generally circular guide surface formed thereon on which said floating equalizers are journalled.

11. A torsional vibration damper assembly as set forth in claim 1, in which the rear retainer plate has a rearwardly offset generally circular guide surface formed thereon on which said floating equalizers are journalled.

12. A torsional vibration damper assembly as set forth in claim 1, in which said retainer plate radial spokes and said hub arms are axially aligned in the absence of applied torque to said hub.

13. A torsional vibration damper assembly as set forth in claim 7, in which one plate of said first floating equalizer includes a plurality of radial fingers, each having an opening, and the opposite plate has openings aligned with said first mentioned openings to receive the ends of a spacer rivet and elongated slots between the openings to receive the spacer rivets of said second floating equalizer.

14. A torsional vibration damper assembly as set forth in claim 13, in which one plate of said second floating equalizer includes a plurality of fingers circumferentially offset from the fingers of said first equalizer plate, each finger having an opening, and the opposite plate of said second equalizer having openings aligned with the finger openings to receive the ends of spacer rivets therefor and elongated notches therebetween accommodating the spacer rivet heads of said first equalizer.

* * * * *